(12) United States Patent
Maly et al.

(10) Patent No.: US 6,963,997 B2
(45) Date of Patent: Nov. 8, 2005

(54) TRANSACTION LOGGING AND INTELLIGENT ERROR REPORTING IN AN EXPECTATION-BASED MEMORY AGENT CHECKER

(75) Inventors: John Warren Maly, Laporte, CO (US); Adam Caison Brown, Fort Collins, CO (US); Zachary Steven Smith, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/771,191

(22) Filed: Feb. 3, 2004

(65) Prior Publication Data

US 2005/0223281 A1    Oct. 6, 2005

(51) Int. Cl.[7] .............................................. G06F 11/00
(52) U.S. Cl. .......................................... 714/20; 714/47
(58) Field of Search .............................. 714/20, 21, 27, 714/33, 34, 37, 39, 45, 48, 47, 57; 703/14, 703/16, 17

(56) References Cited

U.S. PATENT DOCUMENTS

| | | | | |
|---|---|---|---|---|
| 5,930,482 | A | * | 7/1999 | Carter et al. ................. 710/100 |
| 5,938,777 | A | * | 8/1999 | Carter .......................... 714/32 |
| 5,963,735 | A | * | 10/1999 | Sample et al. ................. 703/24 |
| 6,053,948 | A | * | 4/2000 | Vaidyanathan et al. ........ 703/14 |
| 6,073,194 | A | * | 6/2000 | Lowe .......................... 710/100 |
| 6,347,388 | B1 | * | 2/2002 | Hollander ................... 714/739 |
| 2003/0079168 | A1 | * | 4/2003 | Pierce et al. ................. 714/746 |
| 2003/0191615 | A1 | * | 10/2003 | Bailey et al. ................. 703/13 |
| 2003/0191989 | A1 | * | 10/2003 | O'Sullivan ................... 714/47 |

* cited by examiner

Primary Examiner—Nadeem Iqbal

(57) ABSTRACT

Systems, methods and software products are provided for transaction logging and intelligent error reporting in an expectation-based memory agent checker. Simulation status information is appended to one or more transaction log messages generated by the expectation-based memory agent checker. A cause of error indicated by mismatch between simulated output transaction events and expected output transaction events is determined. Information about the error is appended to one or more error messages generated by the expectation-based memory agent checker.

22 Claims, 8 Drawing Sheets

TRANSACTION LOGGING AND INTELLIGENT ERROR REPORTING IN AN EXPECTATION-BASED MEMORY AGENT CHECKER

RELATED APPLICATIONS

This application is related to the following commonly owned and co-filed U.S. patent application, filed Feb. 3, 2004 and incorporated herein by reference: Systems and methods for error tracking and recovery in an expectation-based memory agent checker Ser. No. 10/770,741.

BACKGROUND

Semiconductor technology has advanced at a high rate over the past several decades, resulting in electronic devices with enormous complexity, such as very large scale integration (VLSI) processors. Each such electronic device typically consists of a large number of diverse subsystems; the interaction between these subsystems is also very complex. The likelihood of design errors within the electronic device increases with increased interaction between the subsystems. Accordingly, the cost of converting an electronic device design into a physical device still remains very high since a design error present in the physical device is very costly to correct.

Elimination of design errors as early as possible in a design cycle of the electronic device helps minimize the overall design period and also reduces associated development costs. Interaction between subsystems of the electronic device design is thus extensively tested prior to committing the electronic device design to physical form. In one example of this testing, subsystems of the electronic device design are repeatedly simulated to test the interaction between the subsystems, and between the subsystems and external devices, to identify design errors.

Though it is desirable to test as many of these interactions as possible, the amount of testing is limited by time and cost. Therefore, any increase in the efficiency of testing, and/or in the computer aided design (CAD) tools that facilitate this testing, results in improved device reliability and/or reduced development time and cost.

In addition, the latest generation of processors include a particularly diverse range of subsystems that require improved design and development techniques. For example, modern high performance multi-core processors (such as the Hewlett Packard/Intel "Montecito" processor) represent ultra-complex integrated circuit design and, as such, challenge CAD tools and development techniques. Extensive testing is thus required, particularly prior to reducing the multi-core processor design to physical form.

Within the multi-core processor, memory agents handle memory operations or transactions that access memory (e.g., shared memory and caches). For example, a processor core may read a line of memory stored in one or more locations within the multi-core processor, such as in the shared memory and caches. The memory agents cooperate to determine the source from which the line of memory should be read for the multi-core processor.

The memory agents, shared memory and caches may connect in a number of ways, such as by a bus or by a point to point link using a suitable protocol. A single memory transaction may therefore be quite complex, involving transmission of requests and data back and forth among the memory agents, shared memory and caches. The sequence of transmissions depends upon the locations and states of the line of memory and the bus protocol employed. Testing the operation of the memory agents is an extremely complex and data-intensive procedure.

A point to point link is a switch-based network that may have one or more crossbars that act as switches between the memory agents, shared memories, the processing cores, and other devices. Transactions on the point to point link are packet-based; each packet has a header with routing and other information. Information within the transactions is thus directed to specific locations within the multi-core processor and are routed appropriately by the crossbars.

Figure 1:
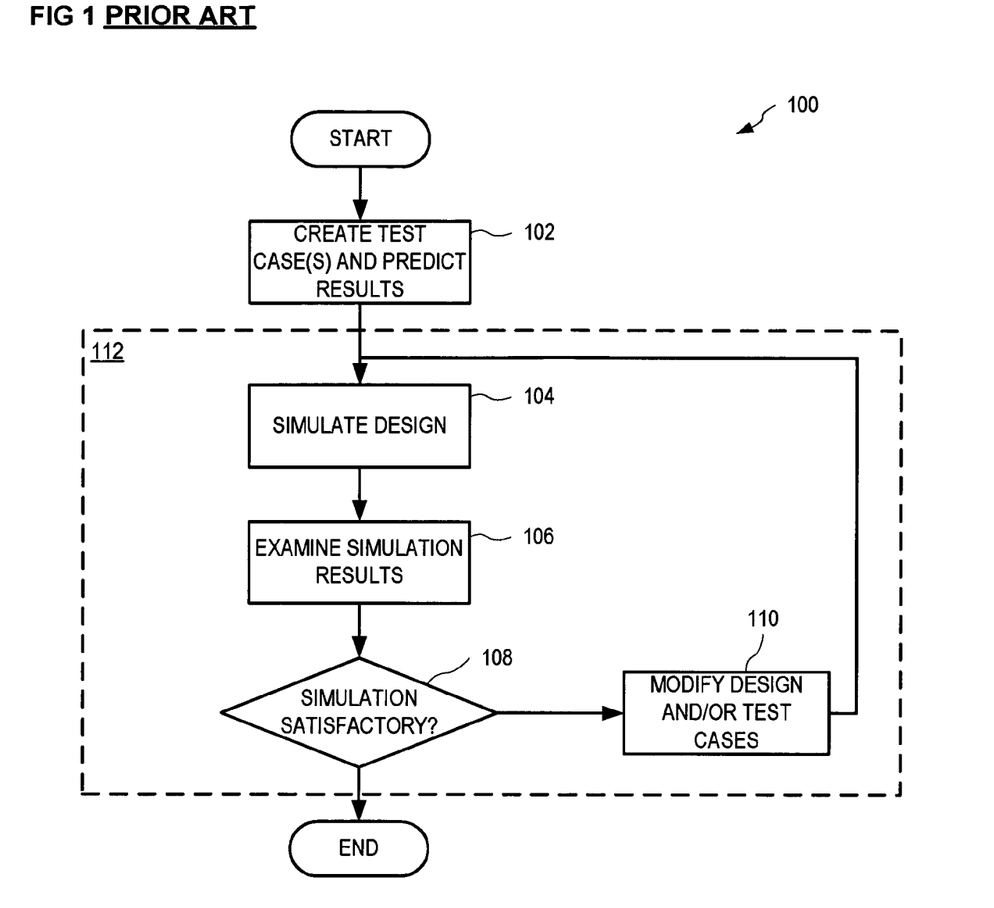
FIG. 1 is a flowchart illustrating a prior art design process for testing an electronic device design.

FIG. 1 is a flowchart illustrating one prior art process 100 for testing, modifying and re-testing an electronic device design prior to committing the electronic device design to physical form. In step 102, process 100 creates one or more test cases for the electronic device design. Each test case typically employs one or more stimuli, used during simulation of the electronic device design, and one or more predicted outputs ('expectations'). In one example, step 102 is performed by a design engineer who creates one or more tests for the electronic device design. In another example, step 102 is performed automatically by an Electronic Computer Aided Design (E-CAD) analysis tool that processes the electronic device design to produce the test cases.

In step 104, process 100 simulates the electronic device design and performs the tests of step 102. For example, in step 104, circuitry of all or part of the electronic device design is entered into an E-CAD simulation tool. The simulation uses the stimuli of each test case (from step 102) to produce simulation output.

In step 106, process 100 compares simulation output of step 104 to the predicted output of step 102, and logs results for each test case. Step 106 may, for example, send error messages to an engineering design terminal to indicate detected errors. In one example of step 106, process 100 compares, for each test case, simulation output of step 104 to predicted output of step 102, indicating that the test is successful if the simulation output matches the predicted output. If, in step 106, process 100 determines that an unexpected event occurred during simulation step 104, process 100 indicates that incorrect operation of one or more subsystems of the electronic device design has occurred. In another example of step 106, process 100 does not receive a predicted event of step 102, again indicating incorrect operation of one or more subsystems of the electronic device design. In another example of step 106, process 100 determines that the simulation output does not match the predicted output of step 102, again indicating incorrect operation of one or more subsystems of the electronic device design.

Step 108 is a decision. In step 108, if one or more errors are detected in step 106, process 100 continues with step 110; otherwise process 100 terminates, indicating that testing of the electronic device design is complete and that the electronic device design operates correctly. If no errors are detected in step 108, for example, process 100 terminates and indicates that the electronic device design is ready for manufacture. In step 110, process 100 modifies the electronic device design to correct errors detected in step 106, or, in certain cases, modifies the expected output, determined in step 102, to change error definitions.

Steps 104, 106, 108 and 110 are typically repeated many times, each iteration correcting problems identified in the electronic device design and/or test cases. When no errors are detected in step 106, the electronic device design is considered to operate correctly for all test cases created in step 102. If no further testing of the electronic device design is required, process 100 terminates and the electronic device design is committed to physical form.

Once the device is manufactured, it is again tested for correct operation and, if successful, the electronic device is often mass produced. If further errors are detected, the electronic device design may again be modified 110 in process 100 and then re-tested with additional test cases.

During operation of process 100, one design error typically causes many test errors, often resulting in duplicate and bogus error indications. Where the test case simulates interaction between one or more subsystems, a design error within one subsystem may therefore result in a plurality of cascaded error messages from process 100. These cascaded error messages (including repeated error messages) may obscure real errors in the system. A verification engineer is therefore required to carefully search through all reported errors to identify the real errors. This searching is difficult and time consuming, resulting in additional development time and cost.

Design modification step 110 of process 100 may thus require extensive analysis of transaction and error logs to identify real errors in the electronic device design. This transaction and error log analysis is often very labor intensive and can occur many times during the development of the electronic device design. The large number of transaction and error log messages created during simulation of the electronic device design makes it difficult for the verification engineer to identify fundamental causes of error, resulting in development delays and increased development costs. In one example, the verification engineer manually traces back through many hundreds of transaction and error log messages to determine fundamental causes of error in memory agent transactions. Further, the error messages and logging information typically produced by process 100 are both voluminous and cryptic, requiring skilled interpretation.

SUMMARY OF THE INVENTION

In one embodiment, a method is provided for transaction logging and intelligent error reporting in an expectation-based memory agent checker. Simulation status information is appended to one or more transaction log messages generated by the expectation-based memory agent checker. Cause of error is determined as indicated by mismatch between simulated output transaction events and expected output transaction events. Information about the error is appended to one or more error messages generated by the expectation-based memory agent checker.

In another embodiment, a system logs transaction and reports intelligent errors in an expectation-based memory agent checker, including: means for appending simulation status information to one or more transaction log messages generated by the expectation-based memory agent checker; means for determining cause of error indicated by mismatch between simulated output transaction events and expected output transaction events; and means for appending information about the error to one or more error messages generated by the expectation-based memory agent checker.

In another embodiment, a software product has instructions, stored on computer-readable media, wherein the instructions, when executed by a computer, perform steps for transaction logging and intelligent error reporting in an expectation-based memory agent checker, including: instructions for appending simulation status information to one or more transaction log messages generated by the expectation-based memory agent checker; instructions for determining cause of error indicated by mismatch between simulated output transaction events and expected output transaction events; and instructions for appending information about the error to one or more error messages generated by the expectation-based memory agent checker.

In another embodiment, a system logs transaction and report intelligent errors in an expectation-based memory agent checker. One or more test cases contain stimuli. An expectation generator generates expected output transaction events based upon the stimuli. A simulator simulates an electronic device design and generates simulated output transaction events. A result checker (a) compares simulated output transaction events and expected output transaction events to determine mismatch, (b) generates transaction log messages, and (c) generates error messages. A message enhancer appends simulation status information to one or more transaction log messages, determines cause of error indicated by the mismatch, and appends information about the error to one or more error messages. A transaction and error log stores the transaction log messages and error messages.

DETAILED DESCRIPTION OF THE FIGURES

Figure 2:
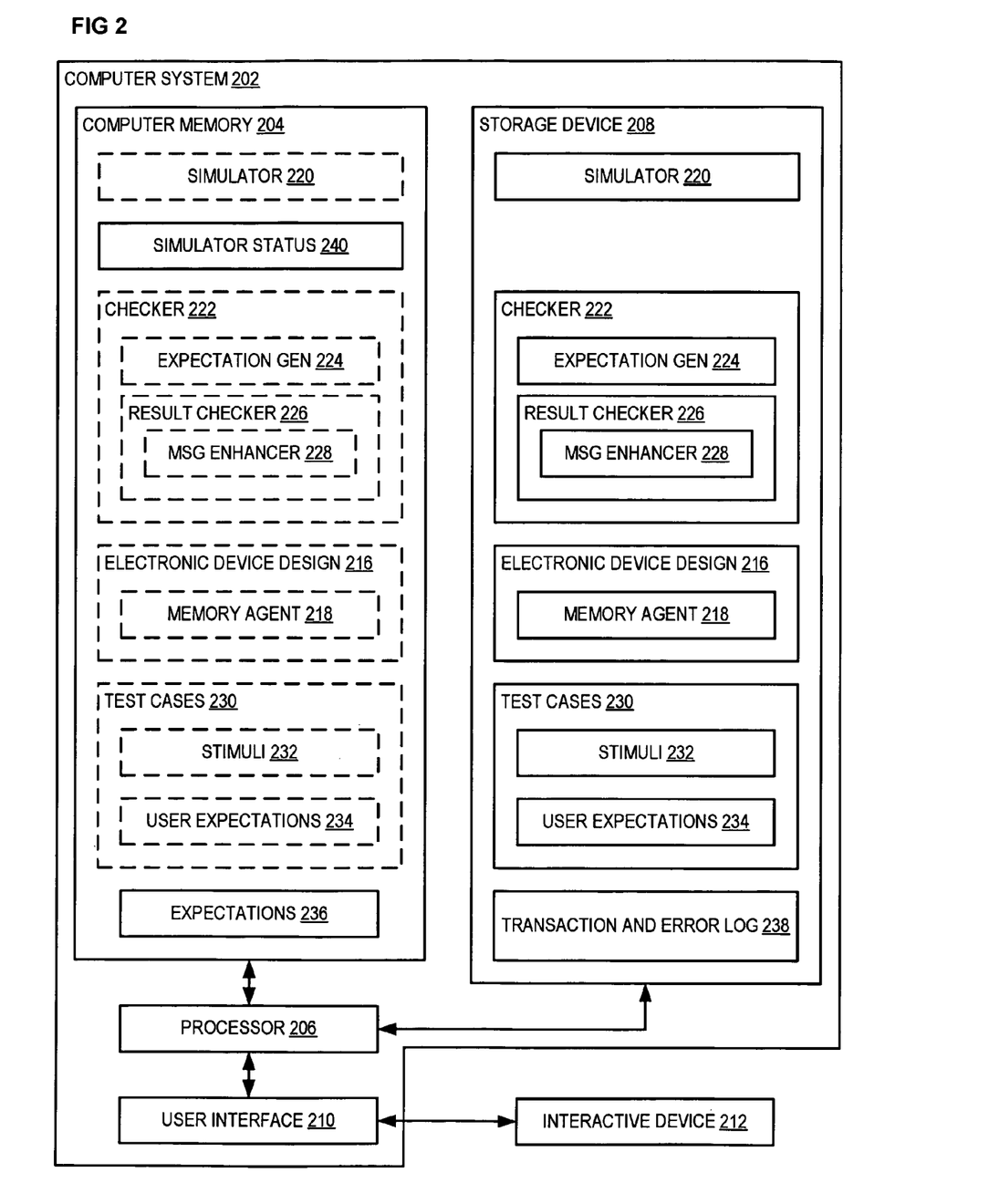
FIG. 2 is a block diagram illustrating one system for transaction logging and intelligent error reporting in an expectation-based memory agent checker.

FIG. 2 is a block diagram illustrating one system 200 for transaction logging and intelligent error reporting in an expectation-based memory agent checker. The expectation based memory agent checker is illustratively shown as a simulator 220 and a checker 222. The expectation based memory agent checker is used to check an electronic device design 216 that includes a memory agent 218. Memory agent 218 is, for example, used in a multi-core processor to handle transactions between memory devices and other subsystems within the multi-core processor. System 200 has a computer 202 with a computer memory 204, a processor 206, a storage device 208, and a user interface 210. System 200 also includes an interactive device 212 connected to user interface 210 of computer 202. Interactive device 212 is, for example, a computer terminal used by a verification engineer to interact with computer 202. Storage device 208 is, for example, a disk drive that stores software and data of computer 202.

Storage device 208 is shown with simulator 220, checker 222, electronic device design 216 and test cases 230. Checker 222 includes an expectation generator 224 and a result checker 226; result checker 226 also includes a message enhancer 228. Simulator 220, checker 222, expectation generator 224, result checker 226, message enhancer 228, electronic device design 216, memory agent 218 and test cases 230 are loaded into computer memory 204 by processor 206 such that simulator 220 and checker 222 are executable by processor 206. Simulator 220, checker 222, expectation generator 224, result checker 226, message enhancer 228, electronic device design 216, memory agent 218 and test cases 230 are therefore shown in dashed outline in computer memory 204 for purposes of illustration. Electronic device design 216 is, for example, a very large scale integration (VLSI) circuit design of an electronic device that includes a memory agent 218. Memory agent 218 handles memory operations, or transactions that access memory (e.g., shared memory and caches), of electronic device design 216.

Figure 3A:
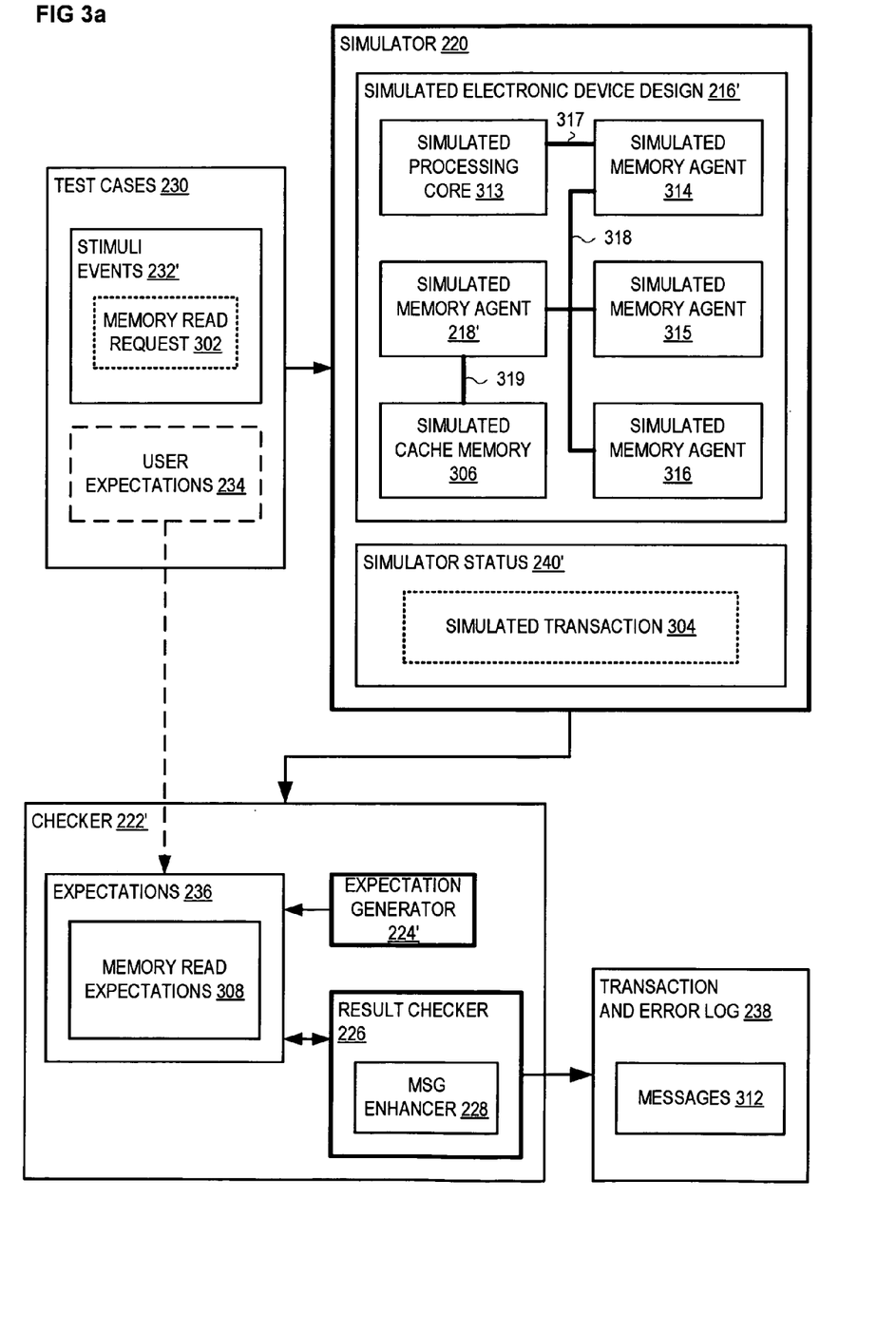
FIG. 3 is a block diagram illustrating exemplary data flow and logic control during simulation and verification of an electronic device design, through cooperation of the simulator and the checker of FIG. 2.

In operation, simulator 220 and checker 222 cooperate to test electronic device design 216, using test cases 230 to produce transaction and error log 238. In particular, simulator 220 first simulates electronic device design 216 (such as shown in FIG. 3a), then stimulates the simulated electronic device design 216 using test cases 230. Checker 222 then observes simulator status 240 to verify correct operation of memory agent 218, producing transaction and error log 238.

By way of illustrative operation, a verification engineer utilizes interactive device 212 to instruct simulator 220 and checker 222, through user interface 210, to test electronic device design 216. Test cases 230 include stimuli events 232 that are used by simulator 220 to stimulate electronic device design 216. In one example, stimuli events 232 are processor instructions for simulated execution by processing cores of electronic device design 216 to stimulate memory agent 218. Checker 222 includes an expectation generator 224 that generates expectations 236, stored in computer memory 204, as shown. Expectations 236 define expected output events of memory agent 218 during simulation of electronic device design 216 using stimuli events 232. Optionally, test cases 230 may include user expectations 234 that are created by one or more verification engineers, to define expected output of memory agent 218 during simulation of electronic device design 216; user expectations 234 may be loaded into expectations 236.

Checker 222 observes simulator status 240 and utilizes a result checker 226, illustratively shown within checker 222, to compare output events of memory agent 218 against expectations 236 and generate messages that are enhanced by message enhancer 228 (which appends additional detail) and output to transaction and error log 238, illustratively shown in storage device 208. In one example, message enhancer 228 uses information of simulator status 240 to enhance messages generated by result checker 226. In another example, message enhancer 228 tracks transaction information of result checker 226 and uses information of expectations 236 to append additional information to messages generated by result checker 226. Transaction and error log 238 may also be output to other devices external to computer 202, for example, to interactive device 212.

Figure 3B:
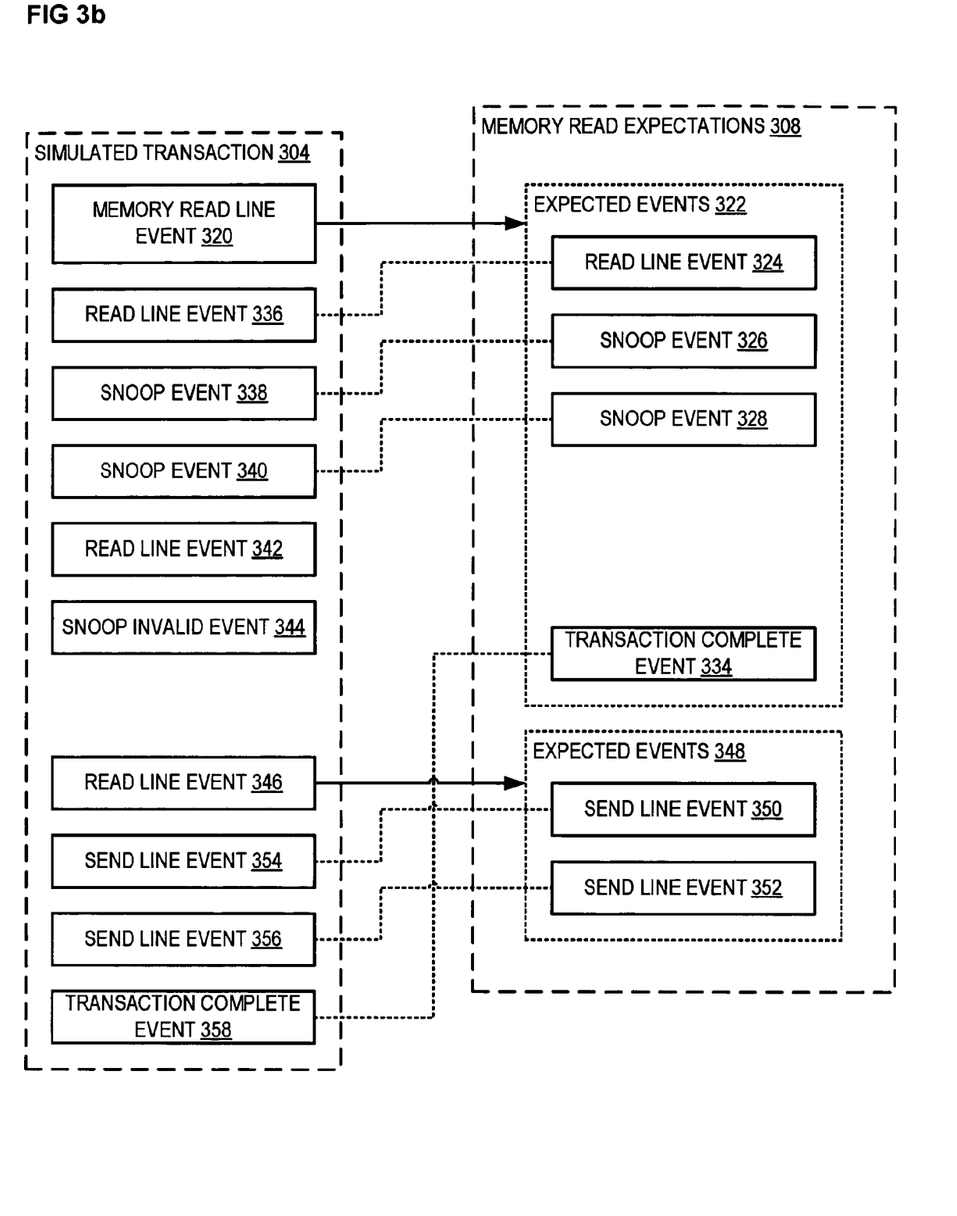

FIG. 3a is a block diagram illustrating exemplary data flow and logic control during simulation of electronic device design 216 by simulator 220, FIG. 2, and observation of simulator status 240' by checker 222, FIG. 2. FIG. 3b is a block diagram illustrating exemplary simulated transaction events of simulated transaction 304 and exemplary expected transaction events of memory read expectations 308 that result from memory read request 302. FIGS. 3a and 3b are best viewed together with the following description.

In FIG. 3a, simulator 220 is illustratively shown with a simulated electronic device design 216' and simulator status 240'. Simulated electronic device design 216' includes simulated memory agents 218', 314, 315, 316, a simulated cache memory 306 and a simulated processing core 313. Simulated memory agents 218', 314, 315, 316 communicate through a simulated point to point link 318; simulated memory agent 218' communicates with simulated cache memory 306 via a simulated communication link 319; and simulated processing core 313 communicates with simulated memory agent 314 via a simulated communication link 317. Simulated memory agent 314 is, for example, a memory agent of simulated processing core 313. Simulated memory agents 315 and 316 are, for example, memory agents of other processing cores (not shown) within simulated electronic device design 216'. In this example, simulated memory agent 218' is tested by checker 222'.

A memory read request 302, of stimuli events 232, is used to stimulate simulated electronic device design 216'. In one example, memory read request 302 is a processor instruction that, when executed by simulated processing core 313, causes simulated processing core 313 to read a line of memory within simulated cache memory 306, initiating a simulated transaction 304 between simulated memory agent 218' and simulated cache memory 306 via communication link 319. FIG. 3b illustrates events of simulated transaction 304. In particular, simulated processing core 313 causes simulated memory agent 314 to generate a memory read line event 320 that is sent from simulated memory agent 314 to simulated memory agent 218', via point to point link 318, thus initiating simulated transaction 304.

In testing simulated memory agent 218', checker 222' observes simulator status 240' to identify events associated with simulated memory agent 218'. In particular, checker 222' observes memory read line event 320 and utilizes expectation generator 224' to generate expected events 322 within memory read expectations 308. In the example, expectation generator 224' has knowledge of simulated processing core 313 and simulated memory agents 218', 314, 315 and 316. Expectation generator 224' therefore generates six expected events within expected events 322: a read message event 324 that simulated memory agent 218' expects to send to simulated cache memory 306; a snoop event 326 that simulated memory agent 218' expects to send to simulated memory agent 315; a snoop event 328 that simulated memory agent 218' expects to send to simulated memory agent 316; and a transaction complete event 334 that simulated memory agent 218' expects to receive from simulated memory agent 314.

Snoop events 326 and 328 are generated by simulated memory agent 218' to request the line of memory from simulated memory agents 315, 316, since the line of memory may be modified and stored in other memories associated with simulated memory agents 315, 316. Note that, in the example, expectation generator 224' does not predict responses to snoop events 326 and 328. However, expectation generator 224' may operate to predict responses to snoop events 326 and 328 and/or user expectations 234 may define expected events of simulated transaction 304 input to expectations 236.

Continuing with the example, checker 222' next observes read line event 336, generated by simulated memory agent 218', within simulated transaction 304 and utilizes result checker 226 to match read line event 336 to read line event 324 within memory read expectations 308. Once matched, expected events are removed from memory read expectations 308. Checker 222' next observes snoop events 338, 340, which result checker 226 matches to snoop events 326, 328, respectively. Checker 222' then observes read line event 342, sent by simulated cache memory 306 and containing the contents of the requested line of memory. Upon receiving read line event 342, simulated memory agent 218' stores the contents of the line of memory internally, and waits for responses to snoop events 326, 328 to learn if the value of the line of memory is current. Checker 222' next observes snoop invalid event 344, sent by simulated memory agent 315 to indicate that the line of memory, requested by snoop event 338, is not stored in memory associated with simulated memory agent 315. Since expectation generator 224' does not generate expectations for snoop events 338, 340, in this example, snoop invalid event 344 is not matched to events of memory read expectations 308.

Checker 222' next observes read line event 346, sent by simulated memory agent 316 and containing a modified value for the line of memory. In one example of operation, in response to snoop event 338, simulated memory agent 316 retrieves a modified value of the line of memory from memory cache associated with simulated memory agent 316. Checker 222' recognizes read line event 346 as an input to simulated memory agent 218' and therefore utilizes expectation generator 224' to generate expected events 348 resulting from read line event 346. Since simulated memory agent 316 responded with a modified value for the line of memory, expectation generator 224' generates (a) a send line event 350, since simulated memory agent 218' is expected to send the modified value of the line of memory to simulated cache memory 306 (to update the value of the line of memory within simulated memory cache 306), and (b) a send line event 352, since simulated memory agent 218' is expected to send the modified value of the line of memory to simulated memory agent 314.

Checker 222' next observes send line event 354, sent by simulated memory agent 218' to simulated cache memory 306 and containing the modified value of the line of memory; and result checker 226 matches send line event 354 to send line event 350. Checker 222' next observes send line event 356, sent by simulated memory agent 218' to simulated memory agent 314. Send line event 356 contains the modified value of the line of memory received from simulated memory agent 316 in read line event 346. Result checker 226 matches send line event 356 to send line event 352 of expectations 236. Checker 222' next observes transaction complete event 358, sent by simulated memory agent 314 to simulated memory agent 218', to terminate simulated transaction 304. Result checker 226 matches transaction complete event 358 to transaction complete event 334, and thus determines that simulated transaction 304 successfully completes. Result checker 226 may generate an appropriate message that is enhanced by message enhancer 228 and written (e.g., as message 312) to transaction and error log 238 indicating the success of simulated transaction 304.

Figure 3C:
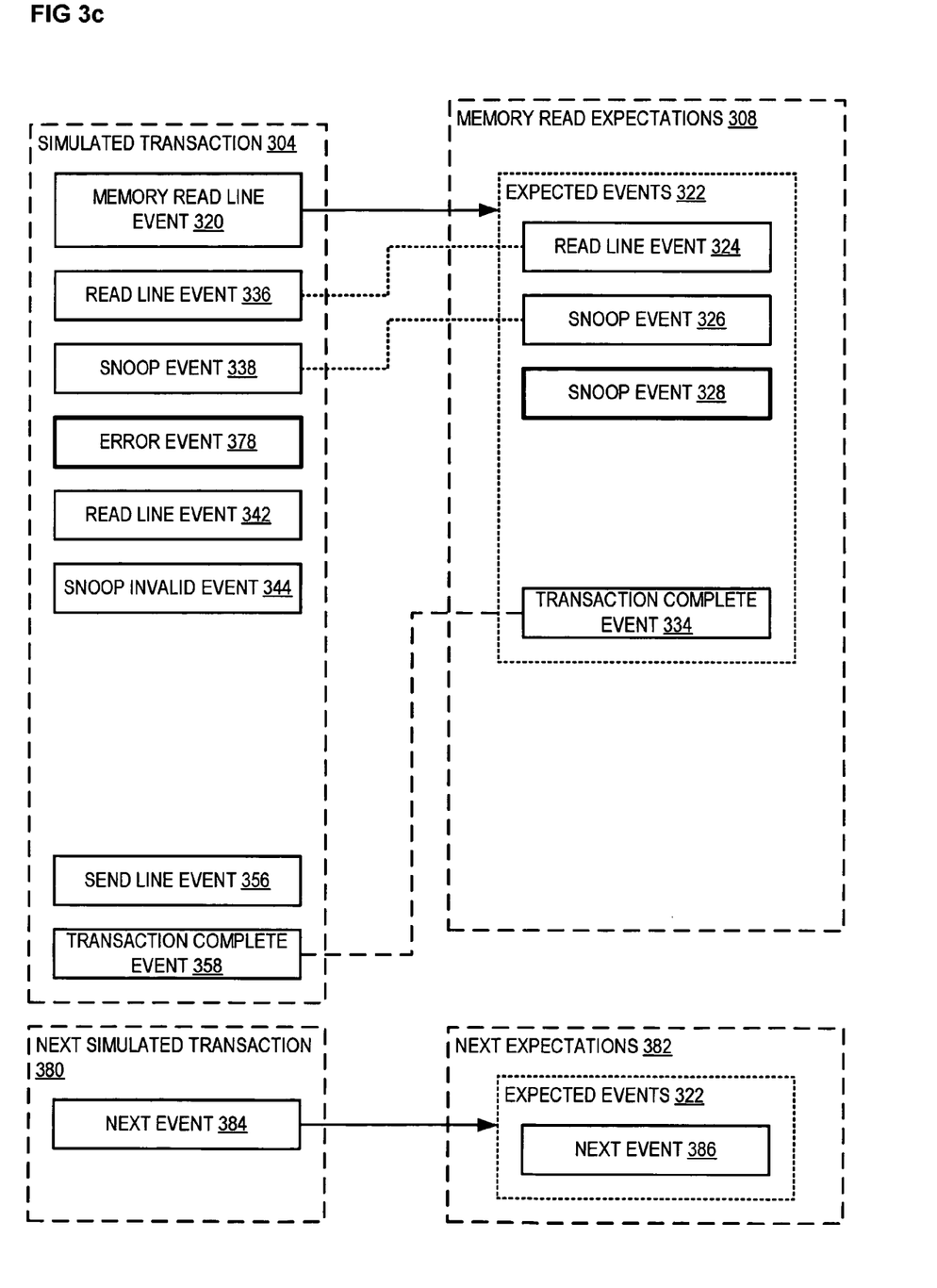

Using the example of FIGS. 3a and 3b, FIG. 3c illustrates one exemplary scenario of an error event 378 occurring in place of expected snoop event 328, FIG. 3b. In the example of FIG. 3c, checker 222' observes memory read line event 320 and uses expectation generator 224' to generate expected events 322. Simulated transaction 304 and events 336 and 338 are observed and matched, respectively, by checker 222' and result checker 226.

In the example of FIG. 3c, checker 222' then observes error event 378, output from simulated memory agent 218', and utilizes result checker 226 to match error event 378 to remaining expected events 328, 334 within memory read expectations 308. In the current example, result checker 226 fails to match error event 378 and generates one or more error messages that are enhanced by message enhancer 228 and output to transaction and error log 238 (e.g., output as messages 312) indicating the erroneous event.

In another example of an error transaction, simulated memory agent 218' prematurely receives transaction complete event 358 for simulated transaction 304. Checker 222' observes transaction complete event 358 and uses result checker 226 to match transaction complete event 358 to transaction complete event 334 while expecting other events of simulated transaction 304. In this example, result checker 226 determines that simulated transaction 304 is not yet complete, and generates an error message that is enhanced by message enhancer 228 and output to transaction and error log 238 (e.g., output as messages 312).

Example messages generated by result checker 226 and enhanced by message enhancer 228 during simulation and verification of simulated electronic device design 216' are set forth below. In particular, example messages generated by message enhancer 228 illustrate one exemplary transaction and error log sequence generated by checker 222' for simulated transaction 304, which is a transaction between simulated memory agent 218' and simulated cache memory 306 within simulated electronic device design 216'.

Example Messages Generated by Message Enhancer 228
208.0: Trans 304: Initial request of type PRLD
208.0: Trans 304: Issuing expectations for an MI flit of type READ_REQUEST, address 0x93ae4500
208.0: Trans 304: Issuing expectation for an XBAR flit of type PSLD, dest 2
208.0: Trans 304: Issuing expectation for an XBAR flit of type PSLD, dest 4
208.0: Trans 304: Issuing expectation for an XBAR flit of type PSLD, dest 6
208.0: Trans 304: Issuing expectation for an XBAR flit of type PSLD, dest 7
208.0: Trans 304: Issuing expectation for an XBAR flit of type PSLD, dest 8
292.1: Trans 304: MI: Expectation for READ_REQUEST, address 0x93ae4500 met
292.1: Trans 304: Issuing speculative expectation for an XBAR flit of type DATA
295.0: Trans 304: Expectation for flit PSLD, dest 2 met
297.0: Trans 304: Expectation for flit PSLD, dest 4 met
299.0: Trans 304: Expectation for flit PSLD, dest 6 met
301.0: Trans 304: Expectation for flit PSLD, dest 7 met
303.0: Trans 304: Expectation for flit PSLD, dest 8 met
336.0: Trans 304: Snoop response of type PSNRI from src 2
336.0: Trans 304: Still waiting for 4 snoop responses
340.0: Trans 304: Snoop response of type PSNRI from src 6
340.0: Trans 304: Still waiting for 3 snoop responses
344.0: Trans 304: Snoop response of type PSNRI from src 7
344.0: Trans 304: Still waiting for 2 snoop responses
348.0: Trans 304: Snoop response of type PSNRI from src 4
348.0: Trans 304: Still waiting for 1 snoop responses
480.0: Trans 304: Snoop response of type PSNRM_D from src 8
480.0: Trans 304: All snoop responses accounted for!
480.0: Trans 304: Issuing expectation for an MI flit of type WRITE_REQUEST, address 0x93ae4500
480.0: Trans 304: Issuing expectation for an MI flit of type WRITE_DATA, address 0x93ae4500

480.0: Trans 304: Issuing expectation for an MI flit of type WRITE_ACK, address 0x93ae4500
480.0: Trans 304: Issuing expectation for an XBAR flit of type PCMP, type 9
480.0: Trans 304: Modified snoop response seen, erasing speculative data return
490.1: Trans 304: MI: Expectation for WRITE_REQUEST, address 0x93ae4500 met
492.1: Trans 304: MI: Data matched, address 0x93ae4500
494.1: Trans 304: MI: Data matched, address 0x93ae4508
496.1: Trans 304: MI: Data matched, address 0x93ae4510
498.1: Trans 304: MI: Data matched, address 0x93ae4518
500.1: Trans 304: MI: Data matched, address 0x93ae4520
502.1: Trans 304: MI: Data matched, address 0x93ae4528
504.1: Trans 304: MI: Data matched, address 0x93ae4530
506.1: Trans 304: MI: Data matched, address 0x93ae4538
508.1: Trans 304: MI: Data matched, address 0x93ae4540
510.1: Trans 304: MI: Data matched, address 0x93ae4548
512.1: Trans 304: MI: Data matched, address 0x93ae4550
514.1: Trans 304: MI: Data matched, address 0x93ae4558
516.1: Trans 304: MI: Data matched, address 0x93ae4560
518.1: Trans 304: MI: Data matched, address 0x93ae4568
520.1: Trans 304: MI: Data matched, address 0x93ae4570
522.1: Trans 304: MI: Data matched, address 0x93ae4578
522.1: Trans 304: MI: TAIL flit seen, erasing expectation!
530.1: Trans 304: MI: Expectation for WRITE_ACK, address 0x93ae4500 met
535.0: Trans 304: Expectation for flit PCMP, dest 9 met
535.0: Trans 304: Complete If, during processing of simulated transaction 304, simulated memory agent 218' issues a premature completion event for simulated transaction 304, result checker 226 detects the premature completion event while expecting other events from transaction 304 (i.e., transaction 304 was not complete and result checker 226 expected to receive other events for transaction 304 prior to the premature completion event). Result checker 226 then generates an error message, such as shown in Error Message 1 below. Message enhancer 228 in turn analyzes expectations 234 to determine that a snoop response was still expected by result checker 226, for example. Message enhancer 228 then appends additional information to the error message, producing Error Message 2, below, which is then sent to transaction and error log 238.

Error Message 1
348.1: Trans 304: Unexpected completion

Error Message 2
348.1: Trans 304: Unexpected completion (memory agent never finished with snoops)

The use of message enhancer 228 may thus promote faster determination of errors detected during simulation of electronic device design 216.

Message enhancer 228, FIG. 2, includes software (as exemplified in pseudo code 1, below) to further process information of expectations 236 when an error is encountered by result checker 226. Continuing with the example above, the Enhanced_Error_Message function of pseudo code 1 may be called to generate meaningful transaction logging and intelligent error reporting when simulated memory agent 218' issues a premature completion event for simulated transaction 304. The Enhanced_Error_Message function first analyses a parameter containing the type of error (e.g., unexpected completion) detected by result checker 226. The Enhanced_Error_Message function then generates a standard message for the error, and then attempts to determine the cause of the error. In the example, the Enhanced_Error_Message function compares the number of snoop responses (e.g., Snoop_Response_Count) received by result checker 226 against the number of snoop responses expected, and determines that not all snoop responses were received. The Enhanced_Error_Message function therefore appends additional information to the standard error message to indicate this anomaly. The message is also output to transaction and error log 228, facilitating identification of the cause of error. Enhanced_Error_Message function also illustrates exemplary code that generates a message when an unexpected event is received by result checker 226. The Enhanced_Error_Message function outputs a standard error message (e.g., "Unexpected event") followed by the expected and unexpected event; this enables the verification engineer to identify the erroneous event compared to the expected event. In certain circumstances, this information may highlight errors in the expectation generator 224 and/or in test cases 230.

Pseudo Code 1

```
Function Enhanced_Error_Message (Error)
{
    If (Error = unexpected_completion)
    {
        Log error message "Unexpected completion"
        If (Snoop_Response_Count < Expected_Snoop_Count)
        {
          Append error message "(memory agent never finished with snoops)"
        }
        else if (Received_Data_Length < Expected_Data Length)
        {
          Append error message "(more data expected)"
        }
    }
    else if (Error = Unexpected Event)
    {
        Log error message "Unexpected Event"
        Append error message "(Expected:",expectations[next], "received:", currentevent,")"
    }
}
```

Transaction and error log 238 thereby contains additional information that facilitates human understanding of information contained within transaction and error log 238.

Pseudo code 1, above, is one example of how message enhancer 228 interrogates expectations 236 and status from simulator 220, to determine further information for output to transaction and error log 238. In one embodiment, software within message enhancer 228 utilizes an external knowledge base to facilitate change and improvement to functionality of message enhancer 228.

The additional information included in transaction and error log 238 may thus codify knowledge of electronic device design 216 such that verification engineers can identify errors within electronic device design 216 without intimate knowledge of electronic device design 216 and without learning architectural vicissitudes.

Figure 4A:
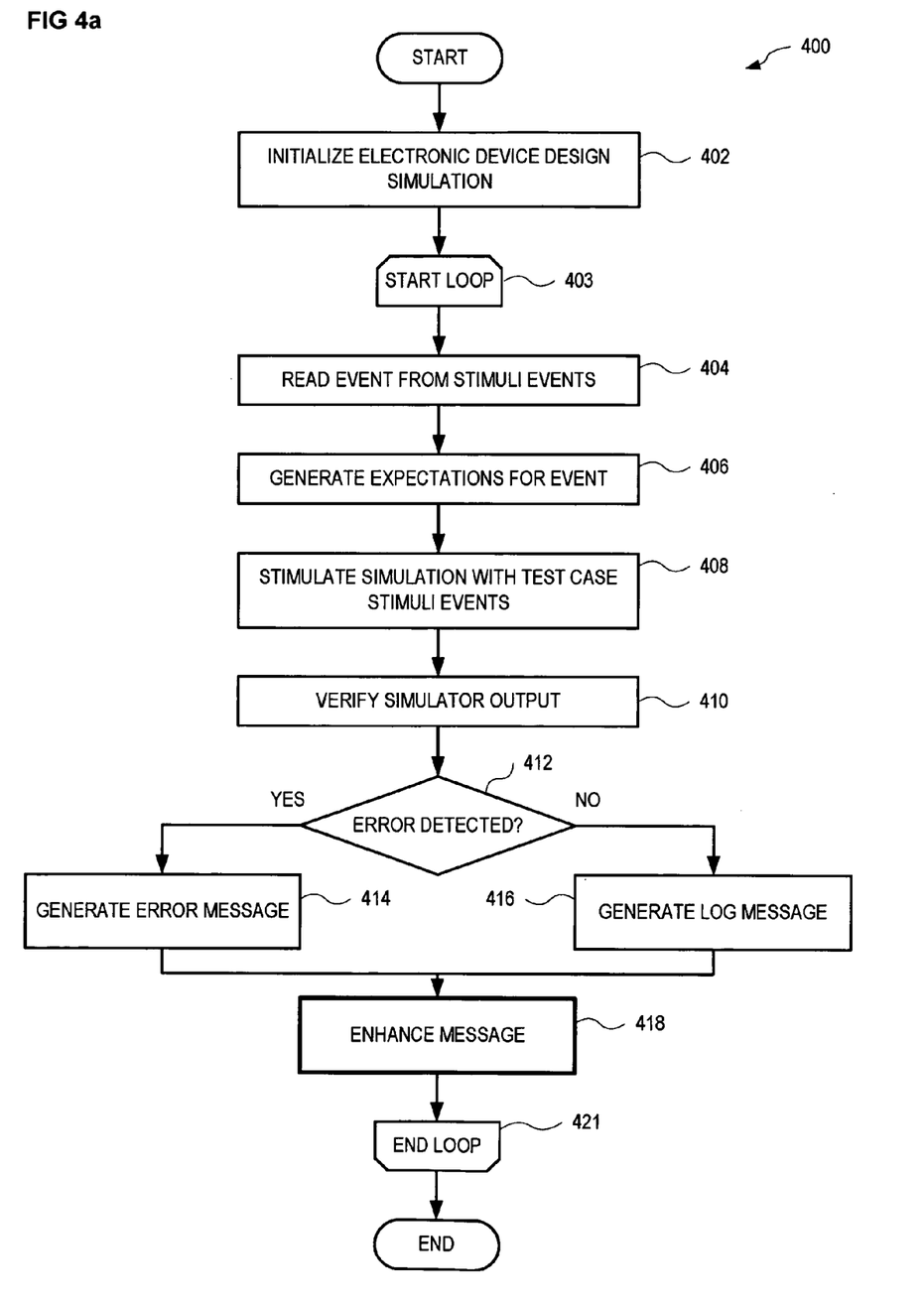
FIG. 4*a* is a flowchart illustrating one process of transaction logging and intelligent error reporting in an expectation-based memory agent checker.

FIG. 4a is a flowchart illustrating one process 400 for transaction logging and intelligent error reporting in an expectation-based memory agent checker. Process 400 is, for example, implemented by simulator 220, expectation generator 224 and result checker 226 of FIG. 3. In step 402, process 400 initializes a simulation of an electronic device design. In one example of step 402, simulator 220 simulates electronic device design 216 as simulated electronic device design 216', creating a simulated memory agent 218' and a simulated local memory 306. In step 404, process 400 reads an event from stimuli events 232. In one example of step 404, process 400 reads local memory read event 302 from stimuli events 232. In step 406, process 400 generates expectations for the event read in step 404. In one example of step 406, expectation generator 224 analyzes local memory read event 302, read in step 404, and generates local memory read expectations 308 that define expected events output by simulator 220. In step 408, process 400 stimulates simulated electronic device design 216' using the stimuli read in step 404, to generate simulator output 240. In one example of step 408, simulator 220 utilizes local memory read event 302 to stimulate simulated electronic device design 216'. In the example, simulator 220 causes a simulated transaction 304 to occur between simulated memory agent 218' and simulated local memory 306, outputting local read event output 310. In step 410, process 400 verifies simulator output 240 against expectations 236 to determine correct operation of simulated electronic device design 216'. In one example of step 410, result checker 226 compares local read event output 310 against local memory read expectations 308 to determine if simulated transaction 304 is successful.

Step 412 is a decision. In step 412, if one or more errors are detected in step 410, process 400 continues with step 414; otherwise process 400 continues with step 416. In step 414, process 400 generates an appropriate error message for the detected error. In step 416, process 400 generates a log message appropriate to the event verified in step 410. In one example of step 416, process 400 generates a log message to indicate that data is transferred to simulated memory agent 218' from simulated local memory 306. In step 418, process 400 utilizes process 430 of FIG. 4b to enhance the message generated in either step 414 or in step 416.

Steps 404, 406, 408, 410, 412, 414, 416 and 418 are repeated one or more times as indicated by loop boundaries 403 and 421. For example, steps 404, 406, 408, 410, 412, 414, 416 and 418 may be repeated for each stimuli event within stimuli events 232.

Figure 4B:
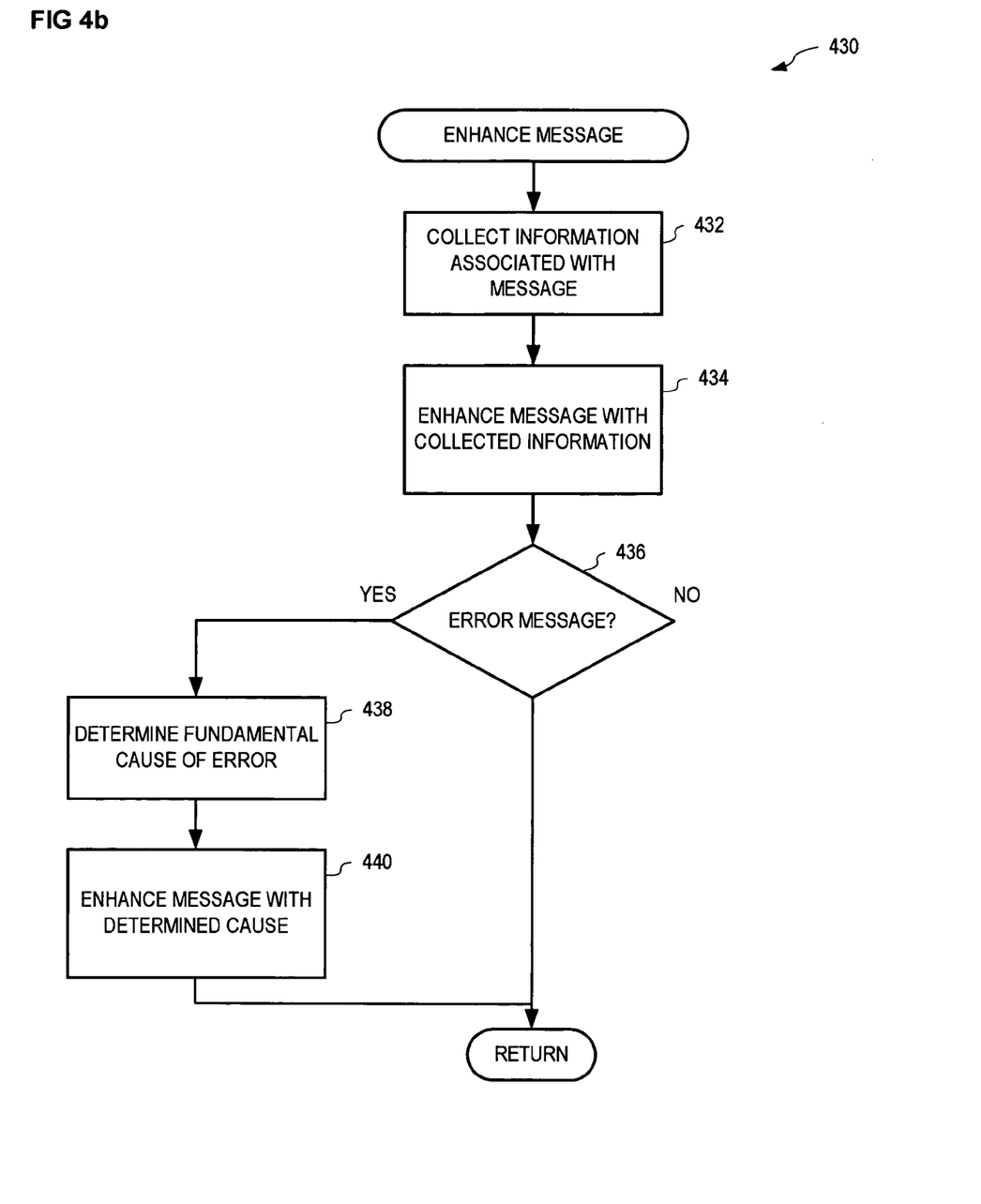
FIG. 4*b* is a flowchart illustrating one process utilized in FIG. 4*a*.

FIG. 4b illustrates one process 430 utilized in step 418 of process 400. Process 430 enhances messages generated by process 400 by determining fundamental causes of detected errors; it adds that information to error messages and/or adds additional status information to the log messages. In step 432, process 430 collects information associated with the message generated in step 414 or 416 of process 400. In the example of FIG. 3a, process 430 may utilize simulator status 240' to determine address and data information for the memory transfer. In step 434, process 400 enhances the message by adding collected information of step 432. Step 436 is a decision. If the message generated by process 400 is an error message, process 430 continues with step 438; otherwise process 400 terminates.

In step 438, process 430 determines a fundamental cause of the error detected in step 410 of process 400. In one example of step 438, process 430 analyzes memory read expectations 308 to determine the fundamental cause of the detected error. In the example, if the detected error is 'unexpected completion', process 430 may backtrack through completed events of expectations 236, counting received snoop events to determine if any are missing. In step 440, process 430 appends additional information to the error message generated in step 414 of process 400, and may generate additional error messages is necessary. Continuing the example of step 438, process 430 may append "memory agent never finished with snoops" to the error message to indicate the fundamental cause of the error.

Figure 5:
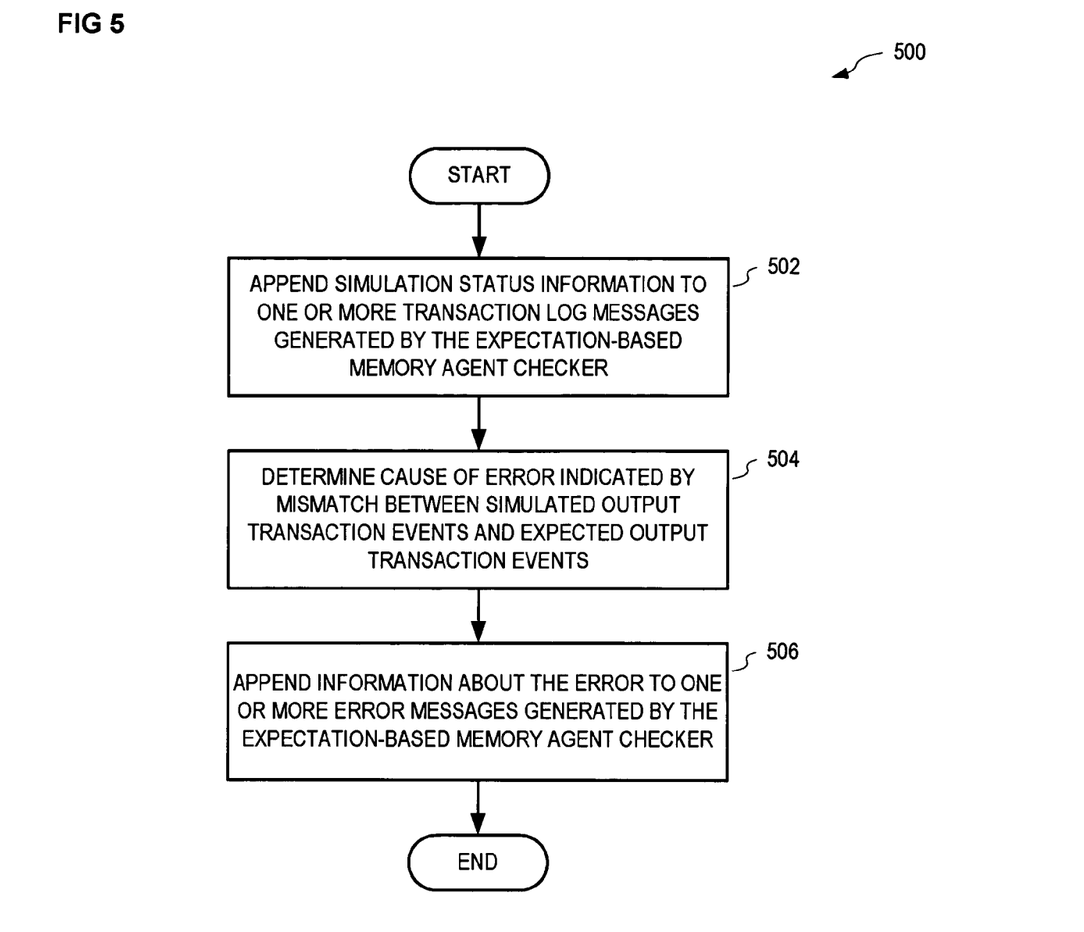
FIG. 5 is a flowchart illustrating one process for transaction logging and intelligent error reporting in an expectation-based memory agent checker.

FIG. 5 is a flowchart illustrating one process 500 for transaction logging and intelligent error reporting in an expectation-based memory agent checker. Process 500 is, for example, implemented in message enhancer 228, FIG. 3. In step 502, process 500 appends simulation status information to one or more transaction log messages generated by the expectation-based memory agent checker. In step 504, process 500 determines cause of error indicated by mismatch between simulated output transaction events and expected output transaction events. In step 506, process 500 appends information about the error to one or more error messages generated by the expectation-based memory agent checker.

Changes may be made in the above methods and systems without departing from the scope hereof. It should thus be noted that the matter contained in the above description or shown in the accompanying drawings should be interpreted as illustrative and not in a limiting sense. The pseudo code provides examples of the types of additional checking that may be performed by the result checker 226 when an error is detected, and should not be considered limiting. Other algorithms may be included in message enhancer 228 to utilize expectation 236 and simulator status 314 to determine root causes of errors detected by results checker 226. In the above description, additional information is described as appended to messages. This additional information may equally be inserted into, or pre-pended to, the message without departing from the scope of the present method and system. The following claims are intended to cover all generic and specific features described herein, as well as all statements of the scope of the present method and system, which, as a matter of language, might be said to fall there between.

What is claimed is:

1. A method for transaction logging and intelligent error reporting in an expectation-based memory agent checker, comprising:

appending simulation status information to one or more transaction log messages generated by the expectation-based memory agent checker;

determining cause of error indicated by mismatch between simulated output transaction events and expected output transaction events; and appending information about the error to one or more error messages generated by the expectation-based memory agent checker.

2. The method of claim 1, further comprising determining the simulation status information by stimulating an electronic device design with stimuli of one or more test cases.

3. The method of claim 2, further comprising generating the simulated output transaction events by stimulating the electronic device design with the stimuli.

4. The method of claim 2, further comprising generating the expected output transaction events based upon the stimuli.

5. The method of claim 2, further comprising electronically processing the stimuli to determine the expected output transaction events.

6. The method of claim 2, further comprising utilizing user input as the expected output transaction events.

7. The method of claim 1, the step of determining comprising electronically reviewing the simulated output transaction events to identify an anomaly in the simulated output transaction events.

8. The method of claim 7, the step of electronically reviewing comprising identifying missing or unfulfilled events as the anomaly.

9. The method of claim 8, further comprising determining a premature completion event, wherein the step of identifying missing or unfulfilled events is initiated upon determining the premature completion event.

10. A system for transaction logging and intelligent error reporting in an expectation-based memory agent checker, comprising:
    means for appending simulation status information to one or more transaction log messages generated by the expectation-based memory agent checker;
    means for determining cause of error indicated by mismatch between simulated output transaction events and expected output transaction events; and
    means for appending information about the error to one or more error messages generated by the expectation-based memory agent checker.

11. The system of claim 10, further comprising means for determining the simulation status information by stimulating an electronic device design with stimuli of one or more test cases.

12. The system of claim 10, the means for determining comprising means for electronically reviewing the simulated output transaction events to identify an anomaly in the simulated output transaction events.

13. The system of claim 12, the means for electronically reviewing comprising means for identifying missing or unfulfilled events as the anomaly.

14. The system of claim 13, further comprising means for determining a premature completion event, the means of identifying missing or unfulfilled events being initiated upon determining the premature completion event.

15. A software product comprising instructions, stored on computer-readable media, wherein the instructions, when executed by a computer, perform steps for transaction logging and intelligent error reporting in an expectation-based memory agent checker, comprising:
    instructions for appending simulation status information to one or more transaction log messages generated by the expectation-based memory agent checker;
    instructions for determining cause of error indicated by mismatch between simulated output transaction events and expected output transaction events; and
    instructions for appending information about the error to one or more error messages generated by the expectation-based memory agent checker.

16. The software product of claim 15, further comprising instructions for determining the simulation status information by stimulating an electronic device design with stimuli of one or more test cases.

17. The software product of claim 15, the instructions for determining comprising instructions for electronically reviewing the simulated output transaction events to identify an anomaly in the simulated output transaction events.

18. The software product of claim 17, the instructions for electronically reviewing comprising instructions for identifying missing or unfulfilled events as the anomaly.

19. The software product of claim 18, further comprising instructions for determining a premature completion event, wherein the instructions for identifying missing or unfulfilled events are initiated upon determining the premature completion event.

20. A system for transaction logging and intelligent error reporting in an expectation-based memory agent checker, comprising:
    one or more test cases containing stimuli;
    an expectation generator for generating expected output transaction events based upon the stimuli;
    a simulator for simulating an electronic device design and generating simulated output transaction events;
    a result checker for (a) comparing simulated output transaction events and expected output transaction events to determine mismatch, (b) generating transaction log messages, and (c) generating error messages;
    a message enhancer for appending simulation status information to one or more of the transaction log messages, for determining cause of error indicated by the mismatch, and for appending information about the error to one or more of the error messages; and
    a transaction and error log for storing the transaction log messages and error messages.

21. The system of claim 20, wherein the simulator produces simulation status information by stimulating an electronic device design with stimuli of one or more test cases.

22. The system of claim 20, wherein the message enhancer electronically reviews the simulated output transaction events to identify an anomaly in the simulated output transaction events.

* * * * *